Feb. 16, 1937.　　　J. P. POSEY　　　2,070,919
RADIATOR GRILLE COVER
Filed Sept. 9, 1935
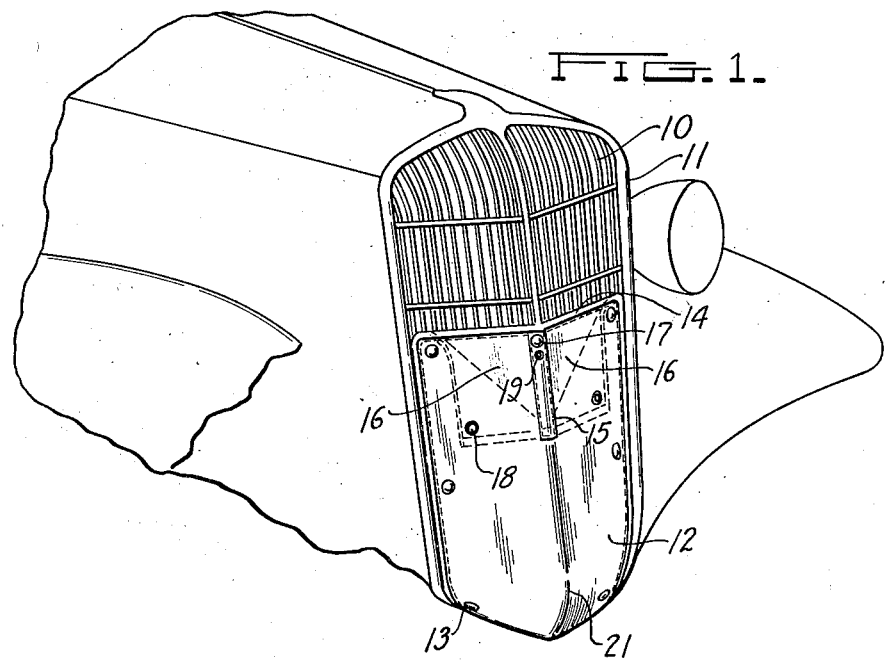
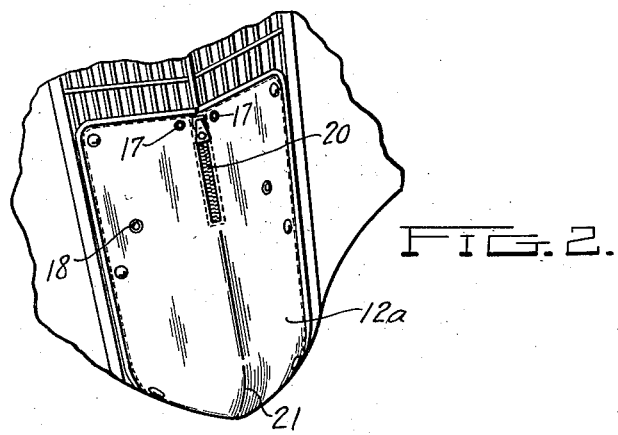
Inventor
John P. Posey
By Owen & Owen
Attorneys Patented Feb. 16, 1937

2,070,919

UNITED STATES PATENT OFFICE 2,070,919

RADIATOR GRILLE COVER

John P. Posey, Toledo, Ohio, assignor to The Hettrick Manufacturing Company, Toledo, Ohio, a corporation of Ohio Application September 9, 1935, Serial No. 39,791

2 Claims. (Cl. 257—132)

This invention relates to covers for automobile radiator grilles, and an object is to produce a simple and efficient cover of this character, which is capable of adjustment, to uncover a greater portion of the grille surface to air currents in accordance with the demand of service. For purposes of illustration but not of limitation, embodiments of the invention are shown on the accompanying drawing, in which:

Figure 1 is a perspective view of a grille cover applied to the grille front of an automobile radiator; and Figure 2 is a fragmentary view of an automobile radiator grille with an alternate form of cover applied thereto.

The illustrated embodiment of the invention is shown in Figure 1, and comprises a grille 10 disposed in front of the radiator of an automobile, the bars of the grille being mounted in a frame 11. Applied to the grille 10 is a cover 12, which covers a substantial portion of the grille, preferably in excess of one-half the exposed surface, and is of a shape to conform to the shape of the grille, completely covering the lower portion thereof. The cover is of flexible fabric material suitably treated to be weather-resistant, and is secured to the grille by a plurality of fastening devices 13, six being employed in this instance. It will be noted that the lower portion of the cover is formed with a bulge 21 in order intimately to fit the lower portion of the grille. The fastening devices may be of any suitable type, such as headed staples, the legs of which extend through eyes (not shown) in the cover and straddle bars of the grille with their ends bent at the inner side of the grille in a well known manner.

The upper edge portion 14 of the cover is substantially horizontal, and beginning at its top center and extending centrally a distance down, is a split, as at 15, to provide opposed flaps 16—16 adapted to have their free inner vertical edges lapped and detachably secured in closed position by snap fasteners 17 to cover a greater portion of the grille. These flaps may be turned back or downwardly to expose a greater portion of the grille and held in folded or open position by cooperating fastening devices 18 and 19.

In the form of the invention shown in Figure 2, the cover 12ª is formed with a split similar to that described in connection with Figure 1, but instead of the flaps overlapping, a zipper arrangement 20 of any well-known form may be employed for holding the flap portions in closed position. By unfastening the flaps the same may be folded downwardly and detachably secured in open position after the manner above described.

It is to be understood that changes in details of construction and choice of materials may be effected without departing from the spirit of the invention, especially as defined in the appended claims.

What I claim as new and desire to secure by Letters Patent is:

1. A radiator grille cover of the class described composed of flexible material and of a shape and size completely to cover the lower portion of the grille opening of a grille, said cover having a horizontally disposed top edge and having a split extending centrally down a distance from said edge to form two triangular flaps adapted to be downwardly folded to expose a predetermined portion of the grille, the free vertical edges of said flaps being in close juxtaposed relation when in closed position, detachable fastening means for holding said juxtaposed edges in closed position, detachable fastening means for holding said flaps in downwardly folded position, and fasteners along the vertically disposed side edges of the cover adapted to connect same to the grille, the upper corners of the cover being thereby held in place but the upper horizontal portion between such corners being free.

2. A radiator grille cover of the class described composed of flexible material, and of a shape and size entirely to cover the lower portion of the grille opening of a grille, said cover having a bulge on the lower end portion thereof to close the lower portion of the grille opening and having a horizontally disposed top edge, a split extending centrally down a distance from the top edge to form two triangular flaps which when folded downwardly expose a predetermined portion of the grille, the vertical edges of said flaps being in close juxtaposed relation when in closed relation, detachable fastening means for holding said juxtaposed edges in closed position, detachable fastening means for holding said flaps in downwardly folded position, and fasteners along the vertically disposed side edges of the cover adapted to connect same to the grille, the upper corners of the cover being thereby held in place but the upper horizontal portion between such corners being free.

JOHN P. POSEY.